United States Patent Office 2,770,521
Patented Nov. 13, 1956

2,770,521

SEPARATION OF URANIUM FROM MIXTURES

Louis Spiegler, Woodbury, N. J., assignor to the United States of America as represented by the United States Atomic Energy Commission No Drawing. Application October 20, 1944,
Serial No. 559,665

11 Claims. (Cl. 23—14.5)

This invention relates to the recovery of uranium from mixtures of uranium or uranium compounds with other metals or metal compounds.

In the manufacture of uranium metal by reaction of a uranium tetrahalide with a more active metal, such as sodium, potassium, magnesium or calcium, there is produced a slag or dross containing uranium, the liberating metal, and impurities, in the form of a mixture of free metals, oxides and halides. The following example of such a process is cited as illustrative:

A retort lined with lime is charged with a mixture of uranium tetrafluoride and magnesium in finely divided condition. To initiate the reaction a small quantity of alkali-metal (potassium or sodium) sometimes is provided at a central point in the charge. After the reaction, which generates sufficient heat to produce uranium in a molten condition and form a fused slag, is complete, the retort is allowed to cool and the crude uranium metal ingot is separated mechanically from slag. The slag contains metallic uranium and combined calcium, magnesium and uranium, and sometimes sodium or potassium, as oxides and fluorides or mixed oxides and fluorides.

In my U. S. Patent No. 2,733,125, which issued on January 31, 1956, I have described a process for converting the uranium metal values in drosses of various origins into aqueous uranyl sulfate solutions. In this process a uranium dross is burned in air to convert metallic uranium to its oxides, the product is mixed with lime, the mixture is roasted in air, the roasted product is mixed with sulfuric acid, and the sulfated product is treated with an oxidizing agent to complete the oxidation of the uranium to hexavalent form.

In my U. S. Patent No. 2,733,126, which issued on January 31, 1956, I have described a process for working up uranium slags to recover their constituents in more valuable form. In this process the slag is crushed, roasted in air to effect a partial oxidation and then heated with concentrated sulfuric acid to convert uranium to soluble form and to expel halogen in gaseous form. An additional oxidizing agent may be added at some point in the process to insure a maximum conversion of uranium to uranyl sulfate. By this process a product is obtained which, though incompletely soluble in water, contains substantially all of the uranium in water-soluble form.

In the U. S. Patent No. 2,741,541 of Sanford B. Smith, which issued on April 10, 1956, a process is described for converting lower oxides of uranium into sulfate solutions by treatment with dilute sulfuric acid and a fluoride.

The process of the present invention has for an object the recovery of uranium from such mixtures, and as a further object the quantitative recovery of uranium substantially free from calcium, magnesium, alkali-metal, iron, and other impurities. A yet further object is the production of uranium peroxide and its substantially quantitative isolation from acidic sulfate solutions.

According to the present invention an aqueous solution of a sulfated uranium product of the type produced by the processes of the aforesaid patents is treated with a peroxide to convert the uranium to uranium peroxide dihydrate ($UO_4.2H_2O$) and the pH of the solution is maintained at a value between 2 and 5 during the crystallization and separation of the uranium peroxide.

I have found that by controlling the pH in the above manner I may obtain uranium peroxide in mechanically separable form while retaining in solution the other metals associated with the uranium, in particular, magnesium, which remains in solution as soluble magnesium sulfate, and residual calcium and iron, probably present as sulfates.

The precipitation of uranium peroxide from aqueous solutions has been carried out as a laboratory procedure in the past. However, prior workers who attempted to precipitate the peroxide from sulfuric acid solution were unsuccessful in securing complete precipitation and in some cases apparently were unsuccessful in securing any precipitation. Previous workers have noted that the presence of other salts, such as salts of sodium, barium, and calcium interfered with the precipitation of uranium peroxide. However, under the conditions of precipitation used in my process practically 100% of the uranium content of the solution is recovered in the form of the peroxide and I find that the presence of soluble salts contributes materially to the effective separation of the uranium peroxide.

In applying my process to a sulfated uranium-containing mixture I prefer to carry out the process in the following manner:

The sulfated mixture is mixed with sufficient water to provide a solution containing between 5% and 10% of uranium an uranyl sulfate. An oxidizing agent such as air, nitric acid, permanganate, chromate, or a peroxide may be added to insure complete conversion of uranium to hexavalent form.

Sulfuric acid at the concentration present is too mild for this purpose. Air is effective but slow in completing the oxidation. Hence one of the more active oxidizing agents is employed for the final clean-up. Hydrogen peroxide has an advantage over the other oxidizing agents listed in that it is less corrosive than nitric acid, it introduces no metallic ion which might contaminate the product, and since the process is associated with a subsequent recovery of uranium using hydrogen peroxide, it avoids the necessity for separate storage facilities for an additional reagent.

The oxidized mixture is heated to a temperature between 70° and 100° C. and sufficient alkaline reagent, such as an hydroxide or carbonate of an alkali-metal, alkaline earth-metal, or ammonium is added to adjust the acidity of a pH between 3 and 4.

If the soluble salt concentration is lower than the preferred concentrations as hereinafter described, an alkaline reagent forming a soluble salt may be employed to advantage to increase this concentration. On the other hand if the soluble salt content is already as high as desired, an alkaline reagent forming an insoluble sulfate may be employed. In the event a carbonate is employed for the pH adjustment, opportunity should be afforded for carbon dioxide to escape in order to avoid the formation of insoluble uranium carbonate.

If the solution pH rises above 4, sulfuric acid may be added to bring the value back to the desired value. The proper pH may be approximately attained by making the solution acid to Brom Cresol Green (pH range 3.8 to 5.4) and neutral to Congo Red (pH range 3 to 5). The end point may be determined more accurately by a pH meter.

After this pH adjustment, the solution is maintained at 70° to 100° C. for a sufficient time (one to four hours) for iron to precipitate substantially completely, as determined, for example, by withdrawing a small sample of the solution and observing that no additional iron precipitates on further heating at constant volume. Solids are then mechanically separated from the solution, that is, by filtration or decantation (either gravitational or centrifugal). The solution is cooled to a temperature at least as low as the lowest temperature to which the solution is subsequently subjected during separation of uranium peroxide, preferably between 20° and 45° C., and any additional solid matter which precipitates during cooling is separated from the solution. The solution now contains not more than about 0.1% of all of the elements, iron, calcium and fluorine. When solutions of low insoluble sulfate content are being treated, the separation at an elevated temperature may be omitted advantageously. Normally however the solid content of the mixture will be so high that the two-step separation is preferable. When iron is the only impurity to be eliminated a hot separation may be sufficient and the second filtration may be omitted. However calcium sulfate, contrary to its behavior in pure water, precipitates from the sulfuric acid solutions containing this material during cooling and with such solutions it is usually preferable to separate this precipitate before forming the uranium peroxide.

I prefer to effect the precipitation of uranium peroxide from a solution with a content of soluble salts lying between 10% and 15% by weight of the mother liquor. A content of 10% to 15% of magnesium sulfate seems to assist the crystal growth of the uranium peroxide by promoting the formation of a more readily separable precipitate than is obtained in the absence of magnesium sulfate. Hence in those cases where such a soluble salt is not present initially, it is desirable to add such a salt for most effective separation. Salts such as sodium sulfate and ammonium sulfate may be used to give the same results as the magnesium sulfate.

In the presence of soluble salts such as magnesium sulfate, sodium sulfate and ammonium sulfate, iron appears to have a definite effect upon the reaction of uranium with hydrogen peroxide. Thus with a constant concentration of the soluble salt an increase in the proportion of iron causes an increase in the quantity of hydrogen peroxide necessary for complete conversion of uranium to the peroxide. On the other hand for a constant iron content an increase in the soluble salt concentration has a similar effect. For the preferred soluble salt concentrations a concentration of iron of the order of 500 parts per million may seriously interfere with the formation of uranium peroxide. Consequently to secure complete recovery of the uranium present, care should be exercised that a proper pH is maintained during separation of iron. By separating iron from the solution at a pH above 3, the iron content of the solution is reduced to a point where serious interference with the uranium conversion is normally avoided. When iron is separated under preferred conditions, that is, with a solution pH of 3.5–3.7 and at a temperature of about 75–95° C., the concentration of iron in the solution is reduced to a value around 5 parts per million and practically no interference with the hydrogen peroxide uranium reaction can be observed.

Hydrogen peroxide in an amount equal to between 105% and 200% of the quantity theoretically required for conversion of hexavalent uranium present to peroxide is then added while the solution is maintained at a temperature between 30° and 65° C. The hydrogen peroxide may be added as an aqueous solution in any concentration up to that of a saturated solution, about 30%. After the hydrogen peroxide has been added, sufficient alkaline reagent, such as alkali-metal or ammonium hydroxide or alkali-metal acetate, is added to restore the pH of the solution to a value between 2½ and 3½, since it is lowered by the sulfuric acid formed by reaction of the peroxide and uranyl sulfate. The most suitable pH value depends upon the results desired. Thus for quantitative precipitation of uranium a pH value of at least 2.8 is most suitable. On the other hand, in the treatment of materials containing substantial quantities of fluorine, lower pH values provide a product of lower fluorine content and it may be desirable in some cases to forego the optimum yield to secure a greater purity. In this case the uranium left in solution can be precipitated at the higher pH in a second step and recovered in a less pure form for use where the impurity is not important or for reworking. Further, when the solution contains materials tending to precipitate at higher pH values and it is desired to avoid contamination of the product by these materials, the pH during and after peroxide crystallization should not be substantially more, say ½ more, and is preferably less than the pH of the clarified solution before peroxide crystallization. If desired, seed crystals of uranium peroxide may be added to the uranium peroxide solution to facilitate crystallization of the uranium peroxide. This is not essential, however, as the uranium peroxide will crystallize out of the solution without such treatment. The maintenance of a temperature above 30° C. is desirable, at least during part of the crystallization, to provide large crystals or crystal agglomerates which can be separated more readily than the crystals formed at room temperature. The crystalline peroxide so precipitated is mechanically separated from the solution, by filtration or centrifugal or gravitational decantation, either before or after permitting the solution to cool, and is washed with water to remove adherent mother liquor. If iron is present, the first washing may be conducted advantageously with a dilute $H_2SO_4$ or $HNO_3$ solution having a pH between 2½ and 3½ and a temperature between 30° and 50° C. to facilitate removal of any iron present in the liquid adhering to the crystals; subsequent washings may be effected with water to remove residual sulfate or nitrate.

In the production of a pure product by the process of the invention, suitable apparatus should be employed to avoid introducing further impurities. Thus it is desirable to employ equipment composed of a material inert to the reagents employed, for example, glass, lead, rubber, neoprene or wood.

The uranium peroxide produced by the process of the invention is suitable for the manufacture of uranium tetrafluoride of high purity.

The following examples will serve to illustrate the process of the invention:

EXAMPLE 1

Part A 2500 parts of cold water and 946 parts of a uranium-containing sulfate mixture, containing 77% sulfate ($SO_4$), 10.6% uranium, 8.3% magnesium, 1% calcium, ⅔% fluorine, 0.1% iron and 2½ parts per million boron, are mixed and aerated for three-quarters of an hour.

Since the resulting solution has the characteristic green color of the tetravalent uranium ion, a small amount of aqueous 28% $H_2O_2$ solution is introduced into the mixture to convert tetravalent uranium to hexavalent uranium as indicated by a change of color from green to yellow. The mixture is then heated at 90–95° C. To the hot yellow mixture, which has a pH less than 1.0, about 500 parts of 325 mesh calcium carbonate ($CaCO_3$) is added over a two hour period to provide a solution pH of 3.7. Care is taken to insure that all of the calcium carbonate reacts. The mixture is maintained at 90–95° C. for one hour to complete the precipitation of iron. The mixture is then filtered and the filter cake washed in the filter with about 600 parts of hot water. The filtrate and wash liquor are collected together and cooled to about 40° C. This treatment precipitates additional calcium sulfate and the precipitate is filtered off.

Part B

Into about 250 liters of a clear solution prepared by the general procedure outlined in Part A and containing about 67 grams of uranium per liter of solution there is introduced gradually, while maintaining the solution at 40–45° C., 11 liters of aqueous 27½% hydrogen peroxide solution in a period of about 2 hours. The mixture is then stirred at the same temperature for an additional hour. During the addition of hydrogen peroxide the pH of the solution drops to about 1.5. Sufficient aqueous 32% NaOH solution to bring the pH back to 3.0 (between 11 and 12 liters) is added during a period of approximately one hour while the solution is agitated rapidly. The solution is maintained at 40–45° C. until crystallization of uranium is complete as determined by testing a sample of mother liquor with potassium ferrocyanide. Crystallization is considered complete when no red or yellow uranyl ferrocyanide is formed. During the crystallization an excess of hydrogen peroxide is maintained in the solution. This is determined at intervals by testing the solution with potassium iodide starch paper. A blue coloration indicates the presence of free $H_2O_2$. When no red or yellow coloration is produced by testing with potassium ferrocyanide, the solution is centrifuged, then filtered to separate the solid uranium peroxide product ($UC_4.2H_2O$). The product is washed with warm water (60–65° C.) until a negative test for sulfate in the washings is obtained.

EXAMPLE 2

To 3500 cc. of a refiltered stock solution of uranyl sulfate obtained by the process described in Example 1, Part A, and containing 4.8 grams of uranium, about 1.6 grams of magnesium and 0.13 gram of calcium per 100 cc., 120 cc. of aqueous 28% hydrogen peroxide solution was added in a period of one and a half hours. 106 cc. of aqueous sodium hydroxide solution (500 grams NaOH per liter) was then added over a period of two hours to render the solution slightly acid to Congo red. The temperature during this period was maintained between 23° and 29° C. 10 cc. of hydrogen peroxide was added and the mixture was stirred for one hour. The mixture was then filtered. The filtrate was clear and upon analysis was found to contain no uranium. The filter cake was washed with distilled water by reslurrying in water, decanting, and filtering until the wash water gave no positive test for sulfate. The product was then air dried. A spectographic analysis for calcium, magnesium, and sodium gave the following results: calcium—2.5 parts per million; magnesium—weak; sodium—weak.

EXAMPLE 3

The purpose of this example was to determine the effectiveness of the present process for removal of boron from uranium.

To 1750 cc. of water, 600 grams of a uranium-containing sulfate mixture (containing 34½% of free sulfuric acid, 15% uranium, 5.4% magnesium, 4% calcium, 0.1% iron, and 2½ parts per million of boron) and 20.5 grams of boric acid ($H_3BO_3$) were added and stirred for one hour. 20 cc. of aqueous 28% hydrogen peroxide solution was then introduced to convert tetravalent uranium to hexavalent form and the mixture was heated to 95° C. 244 grams of calcium carbonate was added to render the solution neutral to Congo red paper (pH 3.0–3.5). The resulting mixture was filtered hot and the filter cake was washed with 500 cc. of hot water which was collected along with the filtrate. The filtrate was then cooled and filtered and 60 cc. of hydrogen peroxide was added. Next 69 cc. of aqueous sodium hydroxide solution (400 grams NaOH per liter) was added to bring the pH to 3 and the mixture was stirred for one hour. It was then filtered in a pressure filter and the filter cake was washed with a small quantity of water. This filtrate (mother liquor and wash water) amounted to 2100 cc. The filter cake was reslurried and refiltered four times with a total of 5600 cc. of distilled water. The final filter cake, amounting to 112 grams of uranium peroxide, contained not more than 0.00004% of boron.

EXAMPLE 4

In order to determine the effectiveness of the process of the present invention for separating uranium from copper, cobalt, chromium, molybdenum, manganese, and nickel, the following tests were carried out:

Into six 250 cc. portions of a stock uranyl sulfate solution, each containing 16.7 grams of uranium, there were added the following portions of metal salts: (a) 0.031 gram $CuSO_4.5H_2O$, (b) 0.015 gram $CrO_3$, (c) 0.032 gram $CoCl_2.6H_2O$, (d) 0.032 gram $NiCl_2.6H_2O$, (e) 0.032 gram $MnSO_4.4H_2O$, (f) 0.012 gram $MoO_3$. To each solution 12 cc. of aqueous 28% hydrogen peroxide was added and the temperature maintained at 40–45° C. for between one-half and one hour. Between 11 and 12 cc. of aqueous sodium hydroxide solution (400 grams NaOH per liter) was then added over a period of one and a half to two hours to readjust the pH of the solution to between 2.8 and 3.0. In each case the uranium peroxide crystallized in the form of readily separable needles. In the case of the solutions containing nickel and cobalt the crystallization was more rapid than in the cases of the other solutions. The uranium peroxide was separated from each solution and analyzed to determine the content of impurity present. The results were as follows:

(a) Copper—0.0005%
(b) Chromium—less than 0.0001%
(c) Cobalt—not detected
(d) Nickel—not detected
(e) Manganese—less than 0.0005%
(f) Molybdenum—0.0045%

The mother liquor in each case was tested with potassium ferrocyanide to determine whether any uranium failed to crystallize out. In the case of samples (a) to (e) no uranium was detected in the filtrate and in sample (f) only a trace was detected.

EXAMPLE 5

The following group of tests was conducted to determine the efficacy of the process of the present invention in removing cadmium, lithium, mercury, and lanthanum:

Four test samples were prepared by mixing 300 grams of a uranium-containing sulfate mixture containing 45 grams of uranium with 875 cc. of water at 30° C. and adding 10 cc. of aqueous 28% hydrogen peroxide. To the four samples the following compounds were added in the amounts indicated:

Sample (a) $Cd(OH)_2$—1.5 grams
Sample (b) $Li_2SO_4.H_2O$—16.6 grams
Sample (c) $HgSO_4$—1.5 grams
Sample (d) $La(NO_3)_3.6H_2O$—4.7 grams Each sample was heated to a temperature between 90° and 95° C. In the case of sample (b) an additional 10 cc. of aqueous 28% hydrogen peroxide was added to insure conversion of uranium present to hexavalent form. Next sufficient calcium carbonate was added to each sample to adjust the pH value between 3.3 and 3.5, the product was filtered hot, and the filter cake was washed with 240 cc. of hot water. The quantities of calcium carbonate used in each case were as follows:

Sample (a)—122 grams
Sample (b)—124 grams
Sample (c)—122 grams
Sample (d)—152 grams In each case the precipitate was free of uranium. The filtrates were then cooled to room temperature, filtered, heated to 35–40° C. and treated with 30 cc. of aqueous 28% hydrogen peroxide. Then about 34 cc. of aqueous sodium hydroxide solution (400 grams per liter) was added to render each solution neutral to Congo red. The solutions were filtered at 35–40° C. and the uranium peroxide filter cakes washed with water until sulfate was no longer detected in the wash liquor. The uranium peroxide products contained the following proportions of the added impurity (based on the dry weight of $UO_4.2H_2O$).

Sample (a)—0.001% cadmium
Sample (b)—0.0004% lithium
Sample (c)—0.02% mercury
Sample (d)—0.3% lanthanum oxide

EXAMPLE 6

In a process similar to that described in Example 5 a uranyl sulfate mixture containing one part of vanadium for each 100 parts uranium was treated for recovery of uranium peroxide. The product thus obtained contained 50 to 80 parts per million of vanadium.

In conducting the process with vanadium as an impurity it has been found that uranium peroxide precipitates quantitatively provided the concentration of vanadium salts is not too high. Thus with a ratio of vanadium to uranium approximating one to one hundred complete precipitation of the uranium may be secured. However, with a ratio double this value, it has been found that there is some interference of the vanadium with the uranium precipitation.

EXAMPLE 7

In tests similar to those of Example 5 in which gallium oxide and samarium chloride were added as impurities in a ratio of 10,000 parts of the impurity per million parts of uranium, the uranium peroxide product contained in the one case between 65 and 70 parts per million of gallium and in the other 2000 parts per million of the samarium.

It is evident that while the separation of samarium is not as efficient as the separation involving gallium a definite separation can be effected and therefore, by repeating the crystallization (i. e. by redissolving the peroxide in sulfuric acid solution and then neutralizing as in the first instance), effective separation can be obtained. Since the recovery of uranium in each case is practically quantitative, repeated precipitation of the peroxide does not materially reduce the yield of the desired product.

Where not otherwise indicated proportions are expressed herein in terms of weights of materials concerned.

It will be understood that I intend to include variations and modifications of the invention and that the preceding examples are illustrations only and in nowise to be construed as limitations upon the invention, the scope of which is defined in the appended claims, wherein I claim:

1. The method of obtaining uranium peroxide from a uranium-containing sulfate mixture which comprises forming a solution of the uranium sulfate in hexavalent form in aqueous sulfuric acid solution having an initial pH between 2 and 5, adding sufficient peroxide to completely convert uranyl sulfate in the solution to uranium peroxide, subsequently adding sufficient alkaline reagent to bring the pH of the solution to between 2 and 5, effecting crystallization of the uranium peroxide from the solution, and separating the crystallized uranium peroxide from the solution.

2. The method of obtaining uranium peroxide as defined in claim 1 wherein the crystallization of uranium peroxide is effected at a temperature between 30° and 65° C.

3. The method of obtaining uranium peroxide as defined in claim 1, wherein the crystallization of uranium peroxide is effected from a mother liquor containing between 10% and 15% of dissolved solids at a temperature between 30° and 65° C.

4. The method of obtaining uranium peroxide from a uranium-containing sulfate mixture which comprises forming a clear solution of the uranium sulfate in hexavalent form in aqueous sulfuric acid solution having an initial pH between 2 and 5 and an iron content less than 500 parts per million, adding sufficient soluble peroxide to completely convert uranyl sulfate in the solution to uranium peroxide, subsequently adding sufficient alkaline reagent to bring the pH of the solution up between 2.5 and 3.5, effecting crystallization of the uranium peroxide from the solution while maintaining a content of soluble sulfate in the solution between 10% and 15% of the mother liquor, and mechanically separating the crystallized uranium peroxide from the mother liquor.

5. The method of obtaining uranium peroxide as defined in claim 4, wherein the crystallization of uranium peroxide is effected at a temperature between 30° and 65° C.

6. The method of obtaining uranium peroxide from a sulfate mixture containing hexavalent uranium and magnesium compounds and comparatively small proportions of calcium, fluorine, and iron compounds, which comprises mixing the mixture with sufficient water to dissolve the hexavalent uranium compounds, adjusting the pH of the solution to between 3 and 4, separating solids from the solution to provide a clear solution at a temperature A between 30° and 65° C., maintaining the clear solution at a temperature between temperature A and 65° C. and adding sufficient hydrogen peroxide to completely convert hexavalent uranium compounds to uranium peroxide, subsequently readjusting the pH of the solution to between 2½ and 3½ and maintaining the solution temperature between temperature A and 65° C. until uranium peroxide crystallizes out, and mechanically separating the uranium peroxide from mother liquor.

7. The method of obtaining uranium peroxide as defined in claim 6, wherein the crystallization of uranium peroxide is effected from a mother liquor containing between 10% and 15% of dissolved solids.

8. The method of obtaining uranium peroxide as defined in claim 6 wherein the crystallization of uranium peroxide is effected from a mother liquor containing between 10% and 15% of a soluble sulfate in solution.

9. The method of obtaining uranium peroxide from a sulfate mixture containing hexavalent uranium and magnesium compounds, free sulfuric acid and comparatively small proportions of calcium, fluorine and iron compounds, which comprises mixing the mixture with sufficient water to dissolve the hexavalent uranium compounds, heating the mixture to a temperature between 70° and 100° C., adjusting the pH of the solution to between 3 and 4, mechanically separating solids from the solution, cooling the solution to a temperature between 20° and 45° C., mechanically separating precipitated solids from the cooled solution, adding sufficient hydrogen peroxide to completely convert hexavalent uranium compounds present to uranium peroxide, subsequently adding an alkaline reagent to adjust the pH to between 2½ and 3½, maintaining the solution at a temperature between 30° and 65° C. until uranium peroxide crystallizes out, and mechanically separating the uranium peroxide crystals from mother liquor.

10. The method of obtaining uranium peroxide as defined in claim 9, wherein the crystallization of uranium peroxide is effected from a mother liquor containing between 10% and 15% of a soluble sulfate in solution.

11. The method of obtaining uranium peroxide from a mixture containing uranium, calcium, magnesium and iron compounds which comprises forming a solution containing between 5% and 10% uranium compounds in hexavalent form in aqueous sulfuric acid, partially neutralizing the solution with lime to a pH between 3 and 4, thereby precipitating calcium sulfate, maintaining the mixture at a temperature A between 70° and 100° C. to reduce the dissolved iron content of the solution to less than 500 parts per million, mechanically separating solids from the solution, cooling the solution to a temperature B between 30° and 65° C., adding sufficient hydrogen peroxide to the solution, while it contains between 10% and 15%, based on mother liquor, of dissolved sulfate, to completely convert hexavalent uranium compounds present to uranium peroxide, subsequently adjusting the pH of the solution to a value between 2½ and 3½, maintaining the solution at a temperature C between temperature B and 65° C. until uranium peroxide crystallization is substantially complete, mechanically separating the uranium peroxide crystals from mother liquor, and washing the separated crystals free from adhering mother liquor.

References Cited in the file of this patent

UNITED STATES PATENTS 2,551,543    Mohr _____ May 1, 1951

OTHER REFERENCES

Rosenheim et al.: Chemical Abstracts, vol. 23, page 4634 (1929).